Aug. 19, 1941.  M. H. PALMER  2,253,248
COMBINATION SHOVEL AND SPREADER BOX
Filed Dec. 4, 1940    2 Sheets-Sheet 1
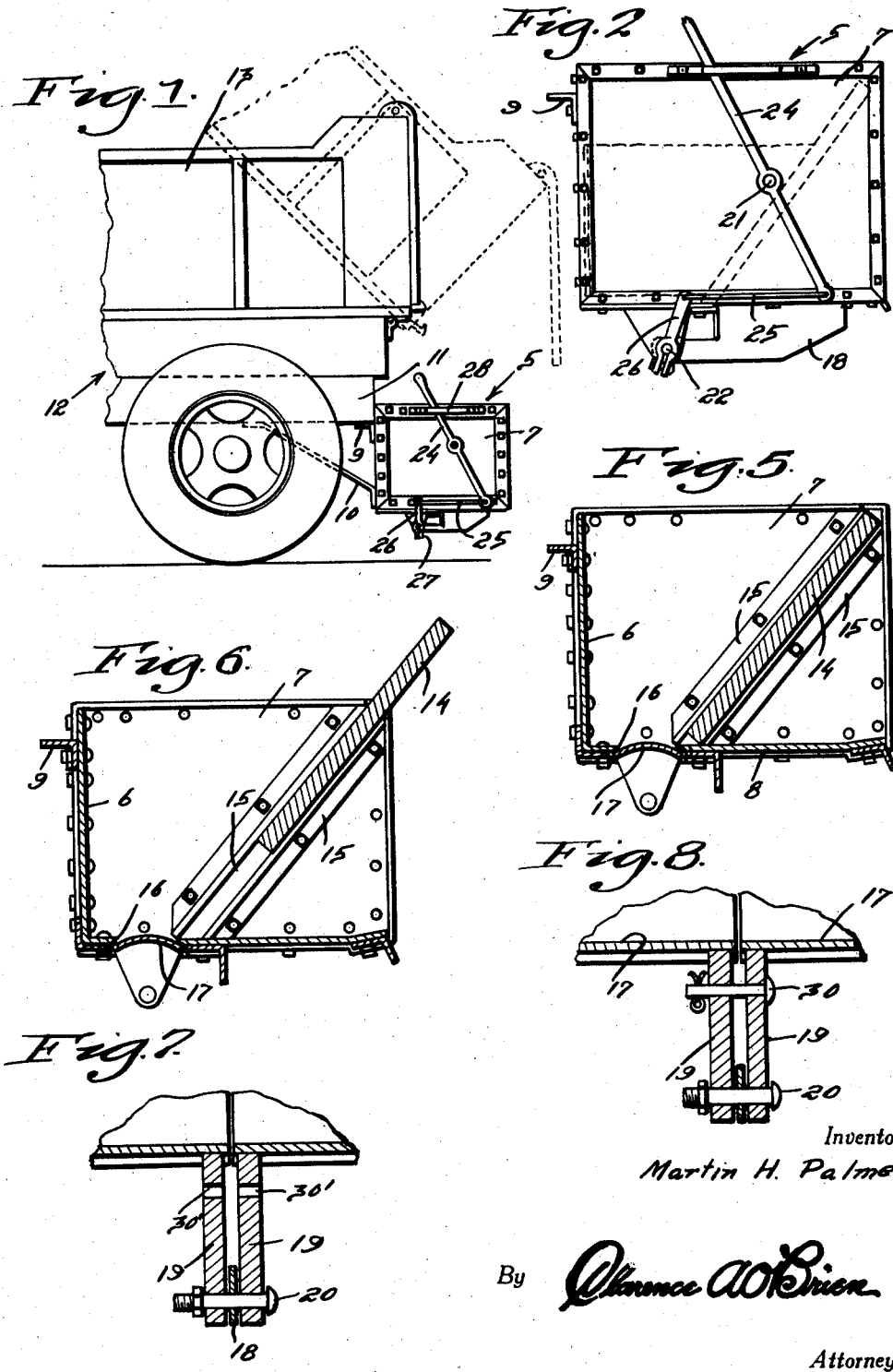
Inventor
Martin H. Palmer
By *Clarence A. O'Brien*
Attorney

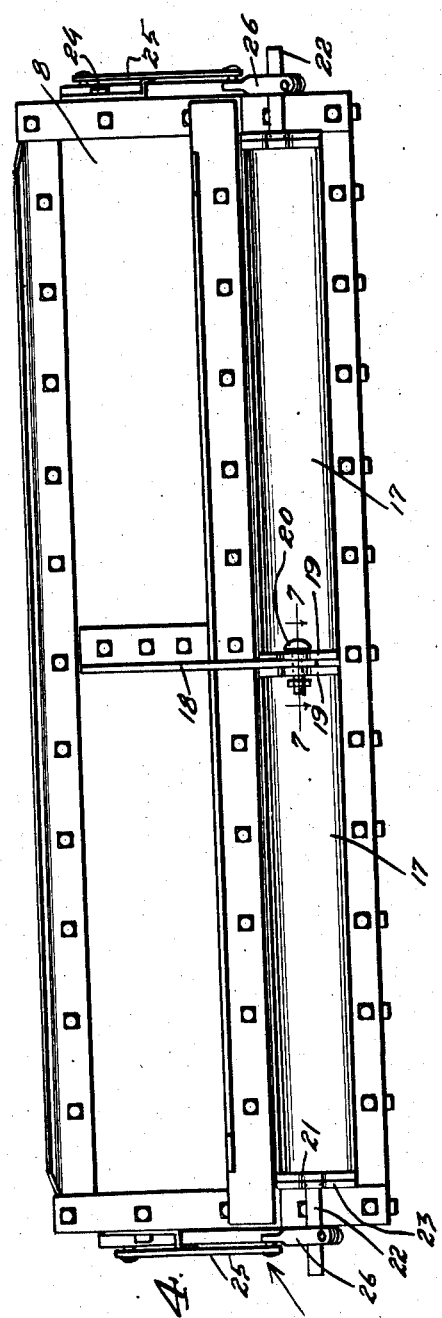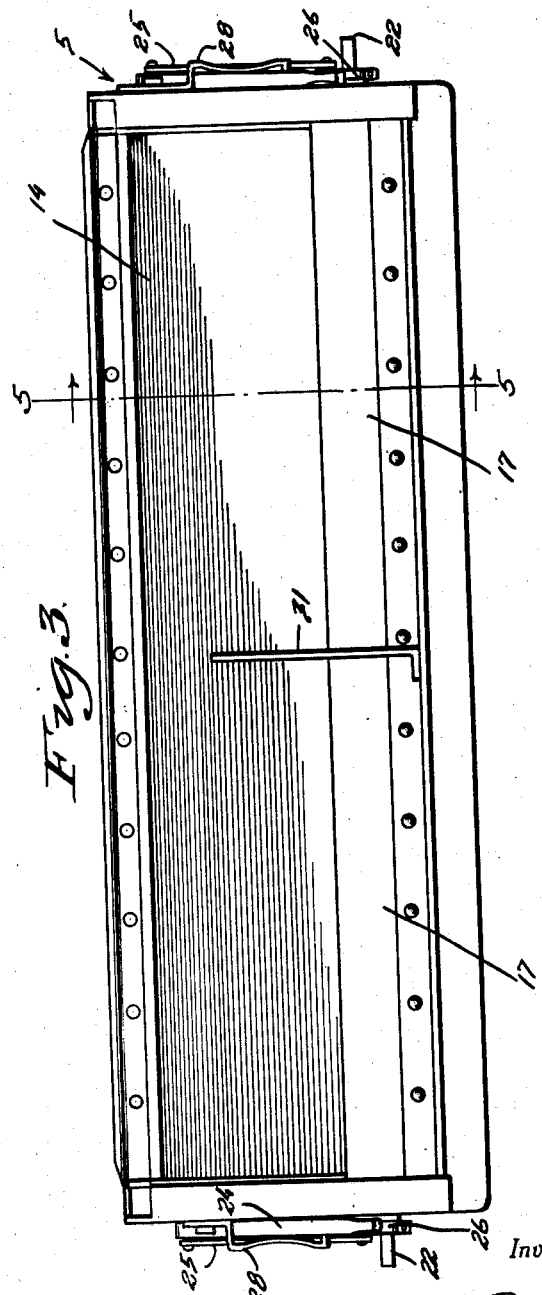

Patented Aug. 19, 1941

2,253,248

UNITED STATES PATENT OFFICE 2,253,248

COMBINATION SHOVEL AND SPREADER BOX

Martin H. Palmer, Fort Klamath, Oreg.

Application December 4, 1940, Serial No. 368,529

2 Claims. (Cl. 275—2)

This invention relates primarily to apparatus intended for use in the spreading of gravel and the like, and an object of the invention is to provide a device of this character which may be readily mounted on the rear of a dump truck for receiving the contents of the body of said truck to facilitate the spreading of such contents over a road-bed incidental to the maintenance and repairing of roads, such as gravelled and oiled roads.

An object of the present invention is also to provide a device of this character in the form of a box which may be readily mounted at the rear of the vehicle to receive, as above stated, the contents of the dump body of the vehicle and with the box so equipped that the material may discharge therefrom to be spread over the road or other surface, or, at the option of the operator shovelled directly from the box forming part of the apparatus.

The invention together with its objects and advantages will be best understood from a study of the following description taken in connection with the accompanying drawings wherein—

Figure 1 is a view showing in side elevation the rear portion of a dump vehicle with the box of the present invention mounted thereon and shown in end elevation.

Figure 2 is an end elevational view of the combination shovel and spreader box constituting the present invention.

Figure 3 is a top plan view of the box.

Figure 4 is a bottom plan view thereof.

Figure 5 is a transverse sectional view taken substantially on the line 5—5 of Figure 3 and with the gate of the box in lowered position.

Figure 6 is a view similar to Figure 5 but with the gate of the box in raised position.

Figure 7 is a detail sectional view taken substantially on the line 7—7 of Figure 4, and Figure 8 is a view similar to Figure 7 but showing the valves forming part of the invention connected together to swing as a unit and simultaneously one with the other.

Referring more in detail to the drawings it will be seen that my device, which by preference is called a combination shovel and spreader box, is indicated generally by the reference numeral 5 and is in the form of an oblong box composed of metal sheets or other suitable material and embodying a longitudinal wall 6, end walls 7, and a bottom wall 8.

The longitudinal wall 6 has bolted or otherwise secured to the outer side thereof a longitudinal angle iron 9 through the medium of which and braces 10 the box 5 is mounted on the bed 11 of a dump vehicle, such as fragmentarily shown in Figure 1 and indicated by the reference numeral 12, and in such position to the dump body 13 of the vehicle that when the body 13 is tilted to the dotted line position shown in Figure 1, the contents of said body 13 will spill into the box 5.

Also for the box 5 there is provided a longitudinally extending gate 14, the opposite end edges of which work in suitable guides 15 provided therefor on the inner sides of the walls 7 and disposed at an incline as shown.

The bottom 8 of the box 5 adjacent the longitudinal wall 6 is provided with a discharge slot 16 elongated longitudinally of the box, and for the slot 16 there are provided a pair of longitudinally aligned valves 17 that are arcuate in cross section as shown to advantage in Figures 5 and 6.

Bolted or otherwise secured to the underside of the bottom 8 of the box intermediate the ends of the box is a transverse cleat 18, and the valves 17 at the inner ends thereof are provided with lugs 19 through the medium of which and a bolt 20 the valves 17 at said inner ends are pivoted to one end of the cleat 18.

At their respective outer ends the valves 17 are also formed with lugs 21 from which extend pintles 22 that are journaled in bearing lugs 23 depending from the bottom 8 of the box 5 adjacent the respective opposite ends of the box as clearly shown in Figure 4.

For each valve 17 there is provided an operating lever 24 that, intermediate its ends, and as clearly shown in Figures 1 and 2, is pivoted to an end wall 7 as at 25.

At one end thereof the operating lever 24 is connected through the medium of a link 25 with a crank arm 26 formed integral with a clamp 27 that embraces a pintle 22, and through the medium of which the crank arm 26 is positively secured to a pintle 22.

Adjacent the upper end thereof each operating lever 24 operates in a suitable guide 28 mounted on the adjacent end wall 7.

It will thus be seen that by rocking a selected lever 24 the valve 17 connected therewith is rotated to the desired open or closed position.

To provide for opening and closing of the valves 17 simultaneously or as a unit, the lugs 19 of the valves are apertured as at 30' to receive a coupling pin 30 as suggested in Figure 8 thus tying the valves together so that manipulation of either lever 24 will result in a rotation of both valves 17.

It will also be noted that the end gate 14 is inclined in the direction of the discharge opening or slot 16 so as to serve to direct the contents of the box 5 through the slot 16 onto the surface upon which the material is to be spread. Obviously with either valve 17 open, material may be spread over the road for one-half the width thereof, or with both valves 17 in open position the material may be spread over the entire width of the road.

Also with valves 17 closed, and the gate 14 in the raised position shown in Figure 6, the contents of the box 5 will be readily accessible from the opened longitudinal side of the box so as to be readily shovelled therefrom.

Also the box 5 is divided into two compartments through the medium of a partition 31 extending inwardly from the longitudinal wall 6 of the box and having its free edge inclined or on a bias to complement the inclination of the gate 14 and therefore in no wise interfere with the sliding movement of the gate 14 to raised or lowered position as the case may be.

It is thought that the simplicity of the box, together with the many advantages thereof will be apparent to those skilled in the art without further detailed description.

It is also to be understood that while I have herein illustrated and described a preferred embodiment of the invention, I claim all such forms of the invention to which I am entitled in view of the prior art and scope of the appended claims.

Having thus described the invention what is claimed as new is:

1. In combination with a dump vehicle, a box mounted on said vehicle in a position to receive the contents of the dump body of said vehicle, said box embodying a bottom wall having a discharge opening elongated longitudinally of the box, a pair of aligned valves controlling said opening, means pivotally supporting said valves on said box in operative position to said opening, manually manipulative means at the respective opposite ends of the box and connected with the respective valves for rotating said valves to control the discharge of the contents of said box through said discharge opening, and means for detachably connecting said valves together to operate simultaneously and in response to the actuation of either of said manipulating means.

2. A spreader attachment for a dump vehicle comprising a box including a bottom wall, a longitudinal wall, and end walls, said bottom wall adjacent said longitudinal wall being provided with a discharge opening elongated longitudinally of the box, aligned valves for said opening pivotally mounted on the bottom wall of said box, operating levers for the valves pivoted on the end walls of the box, an operating connection between each lever and one of the valves for operating the latter, and means for detachably connecting said valves together to rotate simultaneously with one another incidental to a manipulation of a selected one of said levers.

MARTIN H. PALMER.